US011210062B1

(12) United States Patent
Heikinheimo et al.

(10) Patent No.: US 11,210,062 B1
(45) Date of Patent: Dec. 28, 2021

(54) METHODS, APPARATUSES AND SYSTEMS FOR MODIFYING USER-INTERFACE USING VOICE COMMANDS

(71) Applicant: Chief Chief Technologies Oy, Helsinki (FI)

(72) Inventors: Hannes Heikinheimo, Helsinki (FI); Janne Pylkkönen, Espoo (FI); Antti Ukkonen, Espoo (FI); Markus Lång, Espoo (FI); Ari Nykänen, Helsinki (FI); Otto Söderlund, Helsinki (FI)

(73) Assignee: Chief Chief Technologies Oy, Helsinki (FI)

( * ) Notice: Subject to any disclaimer, the term of this patent is extended or adjusted under 35 U.S.C. 154(b) by 0 days.

(21) Appl. No.: 17/207,906

(22) Filed: Mar. 22, 2021

(51) Int. Cl.
| | |
|---|---|
| *G06F 3/16* | (2006.01) |
| *G10L 15/18* | (2013.01) |
| *G10L 15/22* | (2006.01) |
| *H04R 1/08* | (2006.01) |
| *G06F 3/0484* | (2013.01) |
| *G10L 15/08* | (2006.01) |
| *G06F 17/00* | (2019.01) |

(52) U.S. Cl.
CPC ............ *G06F 3/167* (2013.01); *G06F 3/0484* (2013.01); *G10L 15/1815* (2013.01); *G10L 15/22* (2013.01); *H04R 1/08* (2013.01); *G10L 2015/088* (2013.01); *G10L 2015/223* (2013.01); *H04R 2499/15* (2013.01)

(58) Field of Classification Search
CPC ....... G06F 3/167; G06F 3/0484; G10L 15/22; G10L 15/1815; G10L 2015/088; G10L 2015/223; H04R 1/08; H04R 2499/15
See application file for complete search history.

(56) References Cited

U.S. PATENT DOCUMENTS

| | | | | |
|---|---|---|---|---|
| 2019/0317725 A1* | 10/2019 | Shi | .................. | G06F 3/0488 |
| 2020/0335100 A1* | 10/2020 | Saon | ................ | G10L 15/07 |
| 2021/0157972 A1* | 5/2021 | Bradley | ........... | G06F 40/103 |

* cited by examiner

*Primary Examiner* — Quoc A Tran
(74) *Attorney, Agent, or Firm* — Ziegler IP Law Group, LLC

(57) ABSTRACT

A method for modifying user-interface using voice commands. Method includes receiving first and second voice commands of first type respectively at first and second moments of time for creating first and second user-interface elements including first and second information having at least one information attribute associated therewith; receiving third voice command of second type at third moment of time for initiating modification process for modifying first or second user-interface elements; and rendering modified user-interface element on user-interface. Modification process includes extracting, from third voice command, first or second information or information attribute associated therewith; identifying corresponding first or second user-interface element based on extracted information or information attribute; extracting, from third voice command, modifying-intent or modifying-intent attribute; and modifying identified first or second user-interface element based on modifying-intent or modifying-intent attribute. Disclosed also is apparatus and system for modifying user-interface using voice commands.

17 Claims, 6 Drawing Sheets

METHODS, APPARATUSES AND SYSTEMS FOR MODIFYING USER-INTERFACE USING VOICE COMMANDS

TECHNICAL FIELD

The present disclosure relates generally to speech-controlled user-interfaces; and more specifically, to methods, apparatuses and systems for modifying a user-interface using voice commands.

BACKGROUND

Technological advancement, such as in display technology, software, sensors, and so forth, have provided users of various devices to interact with the said devices with ease and pleasure. Specifically, the user-interfaces associated with the said devices enable the easy and pleasurable use of the said devices. Typically, users interact with the user interphases of the devices using buttons, sliders, joystick, stylus, touch on the surface of the digital control panels, sight, gestures, speech, augmented, and other means of input and output associated with the devices. Compared with the buttons, sliders, joystick, stylus, and other such basic input means, the touch, audio and vision are considered to be a more natural and newer means of interaction. Conventional user interphases are primarily touch-based user-interfaces, speech-based user-interfaces, or a combination thereof.

Typically, the touch-based user-interfaces have been associated with most of the daily-use devices and/or appliances. The touch-based user-interfaces provide visual representations on the display control panels of the devices for users' interaction therewith. However, the touch-based user-interfaces involve a number of actions required for performing a desired task. Thereby, the touch-based user-interfaces result in an ineffective operation of the devices associated therewith as well as are time-extensive. In an example, while creating a shopping list on a touch-based user-interface, a user may often require correction of one or more items included in the list. For example, the shopping list includes "Bananas 1 kg", "Apples 2 kg" and "Nails 100 pcs" in order, and the amount of apples in the list is required to be changed from 2 kg to 3 kg. In such example, the touch-based user-interfaces come handy for easily modifying the shopping list thereon by enabling the user to select the list item at the second position and modify it to the desired value.

In recent past, advancement in natural language processing and cloud services particularly has contributed to mass adoption of speech-based user-interfaces. Typically, the speech-based user-interfaces are associated with speech recognition software that allows the user to speak in their natural language and converts them into text on the display of the device. Notably, the speech-based user-interfaces are time-saving since humans can speak on an average 120 words/minute compared to typing only 40 words/minute. The speech-based user-interfaces are of particular importance for incapacitated people, such as visual impairment, handicapped, age-related (kindergartners or old age), patients suffering from neuromuscular disorders for example Parkinson's Disease, illiterate people, or in situations such as during driving, in dark, devices with extremely small displays, and the like. However, the speech-based user-interfaces are by nature linear in time, therefore, possible modification of an already inputted list items is limited to the last entry with notations of "delete", "go back" and the like, only. This results in the recreation of the entire list from the start of the modifying list item or from the scratch at times.

Moreover, the speech-based user-interfaces require the user to spend more time on the user-interface while modifying the spoken information and compromise on the effective operation of the said user-interface.

Therefore, in light of the foregoing discussion, there exists a need to overcome the aforementioned drawbacks with conventional methods of modifying a user-interface element using voice commands.

SUMMARY

The present disclosure seeks to provide a method for modifying a user-interface using voice commands. The present disclosure also seeks to provide an apparatus for modifying a user-interface using voice commands. The present disclosure also seeks to provide a system for modifying a user-interface using voice commands. An aim of the present disclosure is to provide a solution that overcomes at least partially the problems encountered in prior art.

In one aspect, an embodiment of the present disclosure provides a method for modifying a user-interface using voice commands, the method comprising receiving a first voice command of a first type at a first moment of time, creating a first user-interface element using the first voice command, the first user-interface element comprising a first information, the first information having at least one information attribute associated with the first information, receiving a second voice command of the first type at a second moment of time, wherein the second moment of time is later than the first moment of time, creating a second user-interface element using the second voice command, the second user-interface element comprising a second information, the second information having at least one information attribute associated with the second information, receiving a third voice command of a second type at a third moment of time, wherein the third moment of time is later than the second moment of time, initiating a modification process for modifying one of the first or second user-interface elements using the third voice command, wherein the modification process comprises:

extracting, from the third voice command, one of: the first information, the second information, or at least one information attribute associated with the first information or the second information, identifying the corresponding first user-interface element or the second user-interface element based on the extracted at least one of: the first information, the second information, or at least one information attribute associated with the first information or the second information, extracting, from the third voice command, a modifying-intent expression or at least one modifying-intent attribute, and modifying the identified first user-interface element or the second user-interface element based on at least one of: the modifying-intent expression or the at least one modifying-intent attribute, and rendering the modified first or second user-interface element on the user-interface.

In another aspect, an embodiment of the present disclosure provides an apparatus for modifying a user-interface using voice commands, the apparatus comprising a processing arrangement operable to receive a first voice command of a first type at a first moment of time,
create a first user-interface element using the first voice command, the first user-interface element comprising a first information having at least one information attribute associated with the first information,
receive a second voice command of the first type at a second moment of time, wherein the second moment of time is later than the first moment of time,
create a second user-interface element using the second voice command, the second user-interface element comprising a second information, the second information having at least one information attribute associated with the second information,
receive a third voice command of a second type at a third moment of time, wherein the third moment of time is later than the second moment of time,
initiate a modification process for modifying one of the first or second user-interface elements using the third voice command, wherein the modification process comprises
  extracting, from the third voice command, one of: the first information, the second information, or at least one information attribute associated with the first information or the second information,
  identifying the corresponding first user-interface element or the second user-interface element based on the extracted at least one of: the first information, the second information, or at least one information attribute associated with the first information or the second information,
  extracting, from the third voice command, a modifying-intent expression or at least one modifying-intent attribute, and
  modifying the identified first user-interface element or the second user-interface element based on at least one of: the modifying-intent expression or the at least one modifying-intent attribute, and
render the modified first or second user-interface element on the user-interface.

In yet another aspect, an embodiment of the present disclosure provides a system for modifying a user-interface using voice commands, the system comprising
an apparatus for receiving the voice commands, and
a voice managing server communicably coupled to the apparatus, the voice managing server operable to
  receive a first voice command of a first type at a first moment of time,
  create instructions for rendering a first user-interface element using the first voice command,
  receive a second voice command of the first type at a second moment of time, wherein the second moment of time is later than the first moment of time,
  create instructions for rendering a second user-interface element using the second voice command,
  provide the created instructions to the apparatus,
  receive a third voice command of a second type at a third moment of time, wherein the third moment of time is later than the second moment of time,
  initiate a modification process for modifying one of the first or second user-interface elements using the third voice command, wherein the modification process comprises
    extracting, from the third voice command, a data to identify target for modifying one of the first user-interface element or the second user-interface element;
    creating a set of instructions to modify the identified first or second user-interface element based on the third voice command;
  provide the created set of instructions to the apparatus, and
  use the provided set of instructions to re-render the modified first or second user-interface element on the user-interface.

Embodiments of the present disclosure substantially eliminate or at least partially address the aforementioned problems in the prior art, and enable association of modifications to certain user-interface element that is not achieved by conventional speech-based user-interfaces. Such associations enables modifying user-interface elements anywhere in order in the list.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
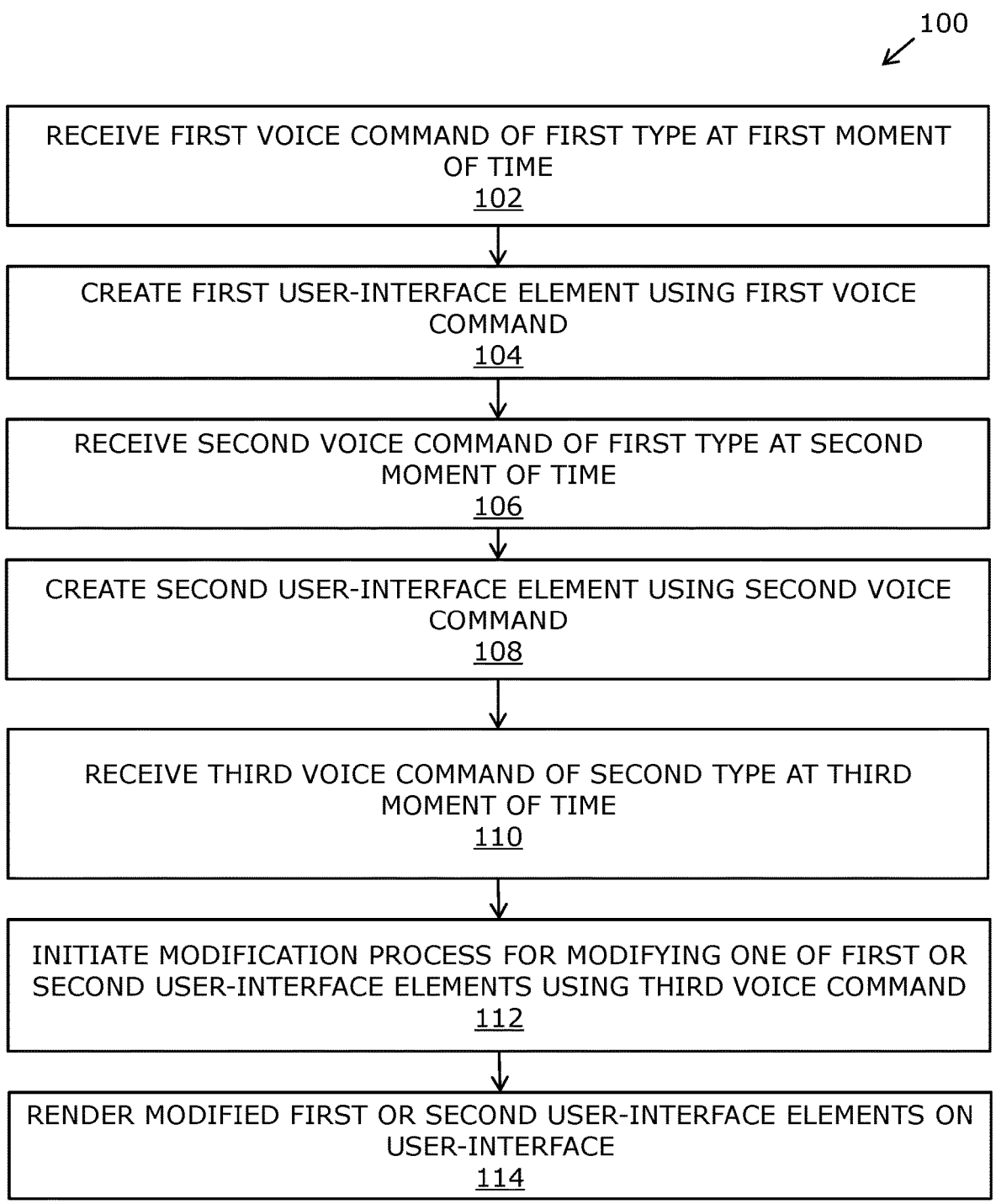
FIG. 1 is a schematic illustration of a flowchart illustrating steps of a method for modifying a user-interface using voice commands, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for modifying a user-interface using voice commands, the method comprising receiving a first voice command of a first type at a first moment of time, creating a first user-interface element using the first voice command, the first user-interface element comprising a first information, the first information having at least one information attribute associated with the first information, receiving a second voice command of the first type at a second moment of time, wherein the second moment of time is later than the first moment of time, creating a second user-interface element using the second voice command, the second user-interface element comprising a second information, the second information having at least one information attribute associated with the second information, receiving a third voice command of a second type at a third moment of time, wherein the third moment of time is later than the second moment of time, initiating a modification process for modifying one of the first or second user-interface elements using the third voice command, wherein the modification process comprises:

extracting, from the third voice command, one of: the first information, the second information, or at least one information attribute associated with the first information or the second information, identifying the corresponding first user-interface element or the second user-interface element based on the extracted at least one of: the first information, the second information, or at least one information attribute associated with the first information or the second information, extracting, from the third voice command, a modifying-intent expression or at least one modifying-intent attribute, and modifying the identified first user-interface element or the second user-interface element based on at least one of: the modifying-intent expression or the at least one modifying-intent attribute, and rendering the modified first or second user-interface element on the user-interface.

In another aspect, an embodiment of the present disclosure provides an apparatus for modifying a user-interface using voice commands, the apparatus comprising a processing arrangement operable to receive a first voice command of a first type at a first moment of time, create a first user-interface element using the first voice command, the first user-interface element comprising a first information having at least one information attribute associated with the first information, receive a second voice command of the first type at a second moment of time, wherein the second moment of time is later than the first moment of time, create a second user-interface element using the second voice command, the second user-interface element comprising a second information, the second information having at least one information attribute associated with the second information, receive a third voice command of a second type at a third moment of time, wherein the third moment of time is later than the second moment of time, initiate a modification process for modifying one of the first or second user-interface elements using the third voice command, wherein the modification process comprises extracting, from the third voice command, one of: the first information, the second information, or at least one information attribute associated with the first information or the second information, identifying the corresponding first user-interface element or the second user-interface element based on the extracted at least one of: the first information, the second information, or at least one information attribute associated with the first information or the second information, extracting, from the third voice command, a modifying-intent expression or at least one modifying-intent attribute, and modifying the identified first user-interface element or the second user-interface element based on at least one of: the modifying-intent expression or the at least one modifying-intent attribute, and render the modified first or second user-interface element on the user-interface.

In yet another aspect, an embodiment of the present disclosure provides a system for modifying a user-interface using voice commands, the system comprising an apparatus for receiving the voice commands, and a voice managing server communicably coupled to the apparatus, the voice managing server operable to receive a first voice command of a first type at a first moment of time, create instructions for rendering a first user-interface element using the first voice command, receive a second voice command of the first type at a second moment of time, wherein the second moment of time is later than the first moment of time, create instructions for rendering a second user-interface element using the second voice command, provide the created instructions to the apparatus, receive a third voice command of a second type at a third moment of time, wherein the third moment of time is later than the second moment of time, initiate a modification process for modifying one of the first or second user-interface elements using the third voice command, wherein the modification process comprises extracting, from the third voice command, a data to identify target for modifying one of the first user-interface element or the second user-interface element;

creating a set of instructions to modify the identified first or second user-interface element based on the third voice command;

provide the created set of instructions to the apparatus, and use the provided set of instructions to re-render the modified first or second user-interface element on the user-interface.

The present disclosure provides the aforesaid method, apparatus and system for modifying a user-interface using voice commands. The method enables receiving voice commands for populating a user-interface, such as by converting the voice commands into text format. Moreover, based on the received voice commands, the method enables modifying the populated user-interface by associating the desired modification with the corresponding user-interface elements appearing in any order of the recorded text. Notably, any number of modifications are feasible without requiring the user to spend a lot of time in populating and/or repopulating (or modifying) the user-interface in case of a wrong or missed entry. Beneficially, the aforesaid method, apparatus and system provide a robust, time efficient and user-friendly control of the user-interface.

Throughout the present disclosure, the term "apparatus" as used herein refers to an electronic device associated with (or used by) the user that is capable of enabling the user to perform the desired tasks associated with the aforementioned system by using the aforementioned method. Optionally, the apparatus includes a display, a camera, a memory, a processing arrangement, a user-interface (communication interface), a microphone, an audio piece, and other components. Moreover, the apparatus is configured to host one or more application programming interfaces thereon to support and/or enable the operation of an associated system. Furthermore, the apparatus is intended to be broadly interpreted to include any electronic device that may be used for voice and/or data communication over a wired or wireless communication network. Examples of apparatus include, but are not limited to, cellular phones, smartphones, personal digital assistants (PDAs), handheld devices, laptop computers, personal computers, etc. Examples of the communication network include, but are not limited to, a cellular network, a short-range radio (for example, such as Bluetooth®) network, Internet, a wireless local area network, and an Infrared Local Area Network, or any combination thereof.

Optionally, the apparatus comprises a display for rendering the user-interface thereon and a microphone for receiving voice commands. Throughout the present disclosure, the term "display" as used herein refers to specialized layer of the apparatus that is configured to render the user-interface for rendering or displaying images when the apparatus is in operation. The display may be provided in devices such as cellular phones, smartphones, personal digital assistants (PDAs), handheld devices, laptop computers, personal computers, tablet computers, desktop computers, extended reality (XR) headsets, XR glasses, televisions, and the like, that are operable to present the text or media to users. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display.

Throughout the present disclosure, the term "microphone" as used herein refers to a specialized component for receiving sound waves as input and converting the received sound waves into electrical energy (or signals) for desired amplification, transmission and recording. Optionally, the apparatus may comprise more than one microphones. Examples of microphones include dynamic microphones, condenser microphones, ribbon microphones, and the like.

Throughout the present disclosure, the term "user-interface" as used herein refers to a means for controlling either apparatuses or software applications by a user thereof. Herein, the term "user" as used herein refers to any entity such as a person (i.e., human being) or a virtual program (such as, an autonomous program or a bot) that is associated with the apparatus or operates the user-interface rendered on the display of the apparatus. The user-interface enables the user to perform a desired task (often comprising one or more operational steps) using the apparatus by providing minimum input to achieve the desired output. Typically, the inputs to the user-interface are provided by means of touch (tactile user-interface), sight (user-interface), sound (voice or speech-controlled user-interface), gesture (gesture user-interface) and the like, alone or in combination (composite user-interface).

The user-interface of the present disclosure is a voice-controlled user-interface or voice user-interface (VUI). The voice-controlled user-interface is a composite user-interface comprising a microphone, an audio piece, a display control panel. Typically, the voice-controlled user-interface receives voice commands as inputs, such as via the microphone of the apparatus, and provides text, visual or auditory output, via the display control panel or the audio piece of the apparatus. It will be appreciated that the voice commands are naturally spoken word(s) or phrases, or alternatively non-verbal sounds (such as humming, voice gestures (for example "oh ah!" or "phew" to represent negation), and the like) relayed from the user of the user-interface as an instruction to the apparatus or software to perform the desired task. The voice commands are received and recognized by the software of the associated apparatus for performing a desired task, such as for example making a list of items. Normally, the voice-controller user-interface enables saving time of the user by avoiding slow typing speed or long sentences and just keeping a few phrases. Moreover, the voice-controlled user-interface provides hands-free experience. Hands-free use of voice-controller user-interface allows users to interact with the apparatus or software applications in an effective, efficient, convenient, intuitive and user-friendly manner, to produce the desired result.

The apparatus comprises a processing arrangement. Throughout the present disclosure, the term "processing arrangement" as used herein refers to hardware, software, firmware or a combination of these. The processing arrangement controls overall operation of the apparatus. In particular, the processing arrangement is coupled to and controls operation of various components of the apparatus and other devices (such as voice managing server, service provider server, and so forth) communicably coupled to the apparatus. It will be appreciated that the processing arrangement is operable to receive a first voice command of a first type at a first moment of time, a second voice command of the first type at a second moment of time, and a third voice command of a second type at a third moment of time, and create a first user-interface element and a second user-interface element using the first voice command and the second voice command respectively and modify one of the first or second user-interface elements using the third voice command, and rendering the modified first or second user-interface element on the user-interface, as discussed above.

Optionally, the apparatus comprises a voice-to-text converting module being executable by the processing arrangement. Throughout the present disclosure, the term "voice-to-text converting module" as used herein refers to a software program comprising a set of instructions for performing speech recognition and translating spoken languages into text. The voice-to-text converting module are typically based on Hidden Markov Model (HMM), deep neural network models, and the like, to convert the voice into text. Normally, the voice-to-text converting module employ an acoustic modelling algorithm, a language modelling algorithm, and, optionally, a pronunciation modelling algorithm for speech recognition. Optionally, the voice-to-text converting module follows a supervised learning or unsupervised learning approaches for speech recognition. Optionally, the voice-to-text converting module is implemented within the apparatus or is communicably coupled to the apparatus as a separate system.

Throughout the present disclosure, the term "first voice command" as used herein refers to a first instruction relayed from the user to the user-interface associated with the apparatus or software to perform a first operation. The first voice command typically comprises one or more words for describing the user-interface to initiate and/or perform the first operation. Optionally, the one or more words may form a phrase or a sentence indicative of how to perform the first operation.

Similarly, the term "second voice command" as used herein refers to a second instruction, following the first voice command and different therefrom, relayed from the user to the user-interface to perform a second operation, different from the first operation. Similarly, the term "third voice command" as used herein refers to a third instruction, following the second voice command and different from the first and second voice commands, relayed from the user to the user-interface to perform a third operation, different from the first and second operations. Optionally, the size or length of the first, second and third voice commands may vary. It will be appreciated that first, second and third are only representative of the number of voice commands received from the user, and a fourth, fifth, sixth, seventh voice command, and so on may be received from the user. In such case, the first voice command is related to an initiation of a task, the second command is related to one or more additions, such as new categories, to the initiated task, following the first voice command, and the third voice command is related to editing information associated with the initiated task or any one or more additions thereto.

Typically, the user-interface receives the first, second and third voice commands. Specifically, the first, second and third voice commands are provided via a microphone of the apparatus associated with the user-interface to be recognized by a voice recognition software associated with the said user-interface. The voice recognition software translates the first, second and third voice commands, as spoken in natural language, into a machine language format.

Moreover, the first, second and third voice commands are received at different moments of time, specifically, the first, second and third moments of time, respectively. The term "time" as used herein refers to the total duration spent on the user-interface to perform the desired task. Moreover, the term "moment of time" as used herein refers to a time point, such as the first, second and/or third moment of time, at which the voice command, such as the first, second and/or third voice command, is provided to the user-interface to perform a given operation, such as the first, second and/or third operation, respectively to complete the desired task. Notably, the first, second and third moments of time may be spaced by same or different durations therebetween. Moreover, the subsequent moments of time are also same or different. The third moment of time is later than the second moment of time, and the second moment of time is later than the first moment of time. Notably, the different moments of time appear in a chronological order, wherein the second moment of time occurs subsequent to the first moment of time, and the third moment of time occurs subsequent to the second moment of time. In this regard, the first voice command associated with the first moment of time is received before the second voice command associated with the second moment of time, and the second voice command associated with the second moment of time is received before the third voice command associated with the third moment of time.

Optionally, the received first and the second voice commands are processed by the processing arrangement of the apparatus in real-time. Moreover, the term "real-time" as used herein refers to a microsecond-level processing time. However, it will be appreciated that the processing speed of the first and the second voice commands may not unduly limit the possibility of other processing speeds, such as nano- or millisecond level, associated with the first and the second voice commands based on the length and framing of the said first and the second voice commands. Alternatively, the received first and the second voice commands are processed from stored (or pre-recorded) files, such as those created in the recent past or saved in particular.

The terms "first type" and "second type" as used herein refer to explicit (abstract) descriptions of operations, such as the first, second or third operation, to be performed. The term "first type" indicates an intent of the first or second voice command associated therewith. The term "second type" indicates an intent of the third voice command associated therewith. Typically, the terms "first type" and "second type" does not include complete information carried by the first, second or third voice commands. Notably, the first and second voice commands of the first type are different from the third voice command of the second type, in terms of the information carried thereby. In such case, the first operation may be related to an entry, for initiation of a task, into an application (or app) accessible using the user-interface, the second operation may be related to an addition to the initiated task, and the third operation may be related to editing any of the initiated or added tasks. The first type of voice command may, for example, be related to creating, adding, appending to or collating, while the second type of voice command may, for example, be related to modifying, removing or adjusting in order, the instructions provided to the user-interface. In other words, the first type of first voice command or the second voice command is intended at creating the said first user-interface element associated with the first voice command or the said second user-interface element associated with the second voice command, respectively, and the second type of third voice command is intended at modifying the said first or second user-interface element.

Throughout the present disclosure, the terms "first user-interface element" and "second user-interface element" as used herein refer to sections for displaying information (namely, categories) fed via the user-interface. Optionally, the user-interface elements may be collated in the form of a list comprising any of: text, media, icons, buttons, checkboxes, sliders, pickers, or a combination thereof. Notably, the first user-interface element and the second user-interface element are created based on the first voice command of a first type and the second voice command of a first type, respectively. Specifically, the first user-interface element is the starting point for the desired task containing two or more user-interface elements, and the second user-interface element is subsequent to the first user-interface element. It will be appreciated that the second user-interface element is not limited to a second serial number in the order, but to user-interface elements in continuation to the first user-interface element. In such case, in an embodiment, the second user-interface element may include a third, fourth, fifth, sixth, seventh user-interface elements, and so on.

Moreover, the first and second user-interface elements comprise the first and the second information, respectively, and the first and the second information comprise at least one information attribute associated with the first and the second information, respectively. The terms "first information" or "second information" as used herein refer to one or more statements or facts related to essence and characteristics of a subject, such as an entity, or an event, useful to a receiver thereof. The first information and the second information populate the first user-interface element and the second user-interface element, respectively. Specifically, first information is different from the second information.

Optionally, the first information or second information comprises one of a grocery item, a utility item, a clothing item, a food item. In an example, the first information or second information is a grocery item such as fruit, vegetable, a cleaning item, a dairy product, or any other consumable. In an example, the first information or second information is a utility item such as a hardware items, a car, an electronic item, furnishings, a decorative item, and the like. In an example, the first information or second information is a clothing item such as readymade garments, fabric, and the like. In an example, the first information or second information is a food item such as bakery products, sweets, dishes, and the like, optionally available from a vendor, such as a restaurant, bakery or via an online food delivery platform, for example. In an example, the first information or second information is a footwear such as shoes, socks, skates, and so on. Alternatively, optionally, the first information or second information may be steps for a process.

Throughout the present disclosure, the term "information attribute" as used herein refers to a numeral or other measurable factor (or characteristic) that defines or classifies the first information or the second information. It will be appreciated that more than one attribute associated with the first information or second information may be identified as useful or critical when selecting or identifying the first information or second information.

Optionally, the at least one information attribute comprises one of: a weight, a number, a quality, a cost, a color, a make, a brand name, a size, a gender, a source, and a credibility. Optionally, at least one information attribute is a weight of the first information or second information in milligrams, grams, kilograms, ounces, pounds, tons, and the like, wherein the first information or second information is a grocery item such as a fruit for example a mango or a banana. Optionally, the at least one information attribute is a quality such as a specific type (namely, variant) of the said entity, an age associated with the said entity, a physical appearance of the said entity, and so forth. Optionally, the at least one information attribute is a color associated with the entity, such a natural colour, an array of colours, a dye, and so on. Optionally, the at least one information attribute is a number, such as a pair, a dozen, pieces, packets, and so forth. Optionally, the at least one information attribute is a cost, such as a range defined by the user or the vendor, a market value, a sale value, a discount, and so on. Optionally, the at least one information attribute is a brand name such as Maruti-Suzuki, LG, Phillips and the like. Optionally, the at least one information attribute is a make such as a car (for example, Wagon-R, Alto, Baleno, Brezza), 2-wheeler (for example, moped, motorbike, cycle, and so on), a mobile phone (for example, touch screen, slide phone, and so on), and so forth. Optionally, the at least one information attribute is a size for example a shoe size, a cloth size, a cross-section, a volume, and so forth. Optionally, the at least one information attribute is a gender such a Men, Boys, Women, Girls, Kids, Baby, and so forth. Optionally, the at least one information attribute is a source such as a geographic area (such as a direction, longitude, latitude, altitude, depth, and so on), geographical origin (such as a country or place, for example Tartan from Scotland, Darjeeling Tea from Darjeeling, India, and the like), and so forth. Optionally, the at least one information attribute is a credibility of the first information or second information in terms of customer rating, a mark certification, and the like, wherein the first information or second information is an electronics item or a hardware equipment such as a washing machine, a television, a helmet, and so forth. In an example, the first information that is a mango, may be selected based on its quality (such as Alphonso, Sensation, Ataulfo, Haden, Irwin, Amrapali, Anderson, Alice and so forth), color (such as yellow, green, red, orange, and so on), shape (such as rounded, pointed, long, and the like) and source (such as USA, India, Equador, and the like).

Optionally, creating the first or second user-interface elements comprises identifying a creating-intent expression, associated with the first type, from the first or the second voice commands. As mentioned earlier, the first or the second voice commands comprises three parts of information related to the desired operation (for example creation, modification, and so forth), the first information or second information, and the at least one information attribute associated with the first information or second information. Specifically, the said desired operation is determined by the intent expression, wherein the intent is a manner by which an input instruction produces the desired operation output. Herein, the intent expression associated with the first type from the first or the second voice commands is the creating-intent expression. Specifically, the creating-intent expression is related to generation or production or initiation of a desired operation. Optionally, the creating-intent expression may be a link between two or more operations. Optionally, a list of creating-intent expression are already provided on the user-interface to help the user select therefrom.

Optionally, the creating-intent expression comprises a first set of keywords defining a beginning of the first or second voice commands. Optionally, the creating-intent expression is or comprises a term or a phrase defining the beginning of the first or second voice commands. The term "beginning" as used herein refers to a start or initiation of the said voice commands. Optionally, the first set of keywords are selected from a group of actions associated with the creation of the first and the second user-interface elements. More optionally, the first set of keywords comprise any one of: "add", "add-on", "add-up", "put-in", "begin", "start", "further", "additionally", "include", "append", "join", "let's begin", "please add", "add more", or "further add", "please add to the list", "also", "add to the list", the first information, the second information, or at least one information attribute associated with one of the first information or second information. Notably, the first set of keywords intend to create (namely initiate) or increase (in number, amount or size) an existing collection by introducing an additional element therein. It will be appreciated that each occurrence of the said creating-intent expression may be same or different from a previous occurrence thereof. In an example, the creating-intent expression for creating the first user-interface element is "Add" associated with the first voice command of the first type and the creating-intent expression for creating the second user-interface element is "Add" associated with the second voice command of the first type. In another example, the creating-intent expression for creating the first user-interface element is "Add" associated with the first voice command of the first type and the creating-intent expression for creating the second user-interface element is "Add-on" associated with the second voice command of the first type. In both the cases, the first and second user-interface elements are created, in a chronological order of receiving the corresponding voice commands.

Alternatively, optionally, the creating-intent expression may be placed at an end of the first and the second voice commands. It will be appreciated that in such a case the complete voice command is required to be analysed before initiating the creation of the first or the second user-interface element based on the first type from the first or the second voice command.

Throughout the present disclosure, the term "modification process" as used herein refers to modifying the one of the first or second user-interface elements using the third voice command. Specifically, modification process results in modification of at least one of the first or the second information or at least one information attribute associated with the first or the second information, as defined by the third voice command.

Moreover, the modification process comprises:
- extracting, from the third voice command, one of: the first information, the second information, or at least one information attribute associated with the first information or the second information,
- identifying the corresponding first user-interface element or the second user-interface element based on the extracted at least one of: the first information, the second information, or at least one information attribute associated with the first information or the second information,
- extracting, from the third voice command, a modifying-intent expression or at least one modifying-intent attribute, and
- modifying the identified first user-interface element or the second user-interface element based on at least one of: the modifying-intent expression or the at least one modifying-intent attribute.

In this regard, it will be appreciated that the third voice command is different from the first or the second voice commands, and may not explicitly contain three parts of information but only information related to the desired operation (for example modification), and any of: the first information, the second information, or the at least one information attribute associated with the first or the second information. Therefore, the third voice command is analysed to extract (namely, determine or identify) data relating to the target first or the second information or the target at least one information attribute associated with the first or the second information. The extracted data is compared to the recorded first or the second user-interface elements to identify: the corresponding first or the second user-interface element if the extracted data relates to at least one of: the first information, the second information, or at least one information attribute associated with the first or the second information. It will be appreciated that the first and the second user-interface elements comprise the first and the second information and associated at least one information parameter, respectively, and the third voice command also comprises data corresponding to at least one of: the first or the second information or associated at least one information parameter. Therefore, initiation of the modification process comprises identifying the first or the second user-interface element corresponding to the desired modification based on the third voice command.

Moreover, the third voice command is also analysed to extract the desired modification, i.e. the modifying-intent expression or the at least one modifying-intent attribute. The term "modifying-intent expression" as used herein refers to a term or a phrase suggestive of a new action for modifying (by means of removing or changing) a previously recorded first or the second information or the at least one information attribute associated with the first or the second information in the first or the second user-interface element, respectively. Specifically, the modification process is initiated upon extracting (or determining) the modifying-intent expression from the third voice command of the second type. The modifying-intent expression is related to the desired modification of the created first or the second user-interface element. Optionally, one modifying-intent expression may be directed towards modifying one or more user-interface elements. Optionally, a list of modifying-intent expression are already provided on the user-interface to help the user select therefrom.

The term "at least one modifying-intent attribute" as used herein refers to a new value of at least one information attribute to replace the identified (namely, previously recorded) at least one information attribute associated with the first or the second information. The extracted modifying-intent is used to modify the identified first or the second information or the at least one information attribute associated with the first or the second information with the new value corresponding to the at least one modifying-intent attribute. Beneficially, the modification process of the present disclosure enables modifying user-interface elements recorded at any position in the chronological order without requiring the user to switch to a hands-on mode or having to delete the later elements (namely, entries) to reach a previous modifying element.

Moreover, the modification may be within a same class or a different class of the at least one information attribute associated with the first or the second information of the first or the second user-interface element, respectively. For example, the at least one information attribute being modified may belong to a weight class. In an example, the identified at least one information attribute and the at least one modifying-intent attribute are "1 kg" and "3 kg" respectively, therefore, the at least one modifying-intent attribute belongs to the same class, i.e. weight in "kg", as that of the identified at least one information attribute. In another example, the identified at least one information attribute and the at least one modifying-intent attribute are "1 kg" and "1 dozen" respectively, the at least one modifying-intent attribute belongs to a different class, i.e. amount or number in "dozens" different from that of the identified at least one information attribute, i.e. weight in "kg".

Optionally, the modifying-intent expression comprises a second set of keywords defining a beginning of the third voice command. Optionally, the modifying-intent expression is a term or a phrase defining the beginning of the third voice command. The term "beginning" as used herein refers to a start or initiation of the said third voice command. Optionally, the second set of keywords are selected from a group of actions associated with modifying the first or the second user-interface element. More optionally, the second set of keywords comprise any one of: "change", "modify", "actually", "not", "not", "reduce", "remove", "please change", "please modify", "add more", or "keep the previous value anyway". Notably, the second set of keywords intend to modify, by means of changing value or category, removing, or substituting the information of any of the first or the second user-interface element. It will be appreciated that the modifying-intent expression may be same or different from a previous occurrence thereof while performing the desired task. In an example, the modifying-intent expression for modifying the first or the second user-interface element is "not" followed by at least one information attribute and at least one modifying-intent attribute. In such example, the modification process is related to the modification of a value associated with the said at least one information attribute in the corresponding first or the second user-interface element with the said modifying-intent attribute. In another example, the modifying-intent expression for modifying the first or second user-interface elements is "no" followed by the first or the second information. In such example, the modification process may end up removing the first or the second information from the corresponding first or the second user-interface element.

Alternatively, optionally, the modifying-intent expression may be placed at an end of the third voice command. It will be appreciated that in such case the complete third voice command is required to be analysed before initiating the modification of the first or the second user-interface element based on the third voice command.

Furthermore, the modified first or second user-interface element is rendered on the user-interface. Optionally, the modified first or second user-interface element is rendered on the user-interface in at least one of: a text format, media, icon, or a combination thereof. The first or the second user-interface elements and the modified first or second user-interface element may be rendered on the user-interface in chronological order of receiving the corresponding first, second and third voice commands, respectively. Optionally, the first or the second user-interface elements and the modified first or second user-interface element may be rendered on the user-interface in the real-time of receiving the corresponding first, second and third voice commands, respectively. Alternatively, optionally, the first or the second user-interface element and the modified first or second user-interface element may be rendered on the user-interface in periodic intervals, such as after every 1 minute, for example.

Optionally, the modification process comprises returning one of the first or the second user-interface element back to a previous value after a first modification of the corresponding first or the second user-interface element. In this regard, the modifying-intent expression may, for example, be "keep the previous value anyway", "return to the previous value", "cancel the last modification", and so forth. It will be appreciated that in order to return to a previous value, the said previous value must be stored for access thereof. For example, there is a database for maintaining a log history for storing data related to each of the first and the second user-interface elements. Typically, the log history keeps track of the different inputs and corresponding outputs. Specifically, the log history records all the instructions, operations, and corresponding results. More specifically, the log history records all the instructions, operations, and corresponding results as they occur. Therefore, the log history is a sequential series of time-stamped actions and related information. Optionally, the log history comprises data related to the first information, the second information, at least one information attribute associated with the first information or the second information, values corresponding to the at least one information attribute, the creating-intent expression, the modifying-intent expression, the at least one modifying-intent attribute, the modified first user-interface element, and the modified second user-interface element. In other words, the log history comprises information related to the start, progression and completion of the desired task, including the instructions and the final outputs. Beneficially, the log history enables user to track and control the user-interface.

The present disclosure also relates to the method as described above. Various embodiments and variants disclosed above apply mutatis mutandis to the method.

Optionally, creating the first or second user-interface elements comprises identifying a creating-intent expression, associated with the first type, from the first or the second voice commands.

Optionally, the creating-intent expression comprises a first set of keywords defining a beginning of the first or second voice commands.

Optionally, the first set of keywords are selected from a group of actions associated with the creation of the first and the second user-interface elements. More optionally, the first keywords comprise any one of: "add", "add-on", "add-up", "put-in", "begin", "start", "further", "additionally", "include", "append", "join", "let's begin", "please add", "add more".

Optionally, initiating the modification process comprises identifying a modifying-intent expression, associated with the second type, from the third voice command.

Optionally, the modifying-intent expression comprises a second set of keywords defining a beginning of the third voice command.

Optionally, the second set of keywords are selected from a group of actions associated with modifying the first or the second user-interface element. More optionally, the second keywords comprise any one of: "change", "modify", "actually", "not", "not", "reduce", "remove", "please change", "please modify", "add more", or "keep the previous value anyway".

Optionally, the first information or second information comprises one of a grocery item, a utility item, a clothing item, a food item.

Optionally, the at least one information attribute comprises one of: a weight, a number, a quality, a cost, a color, a make, a brand name, a size, a gender, a source, and a credibility.

Optionally, the method further comprises creating a log history for storing data related to each of the first and the second user-interface elements.

Optionally, the log history comprises data related to the first information, the second information, at least one information attribute associated with the first information or the second information, values corresponding to the at least one information attribute, the creating-intent expression, the modifying-intent expression, the at least one modifying-intent attribute, the modified first user-interface element, and the modified second user-interface element.

Optionally, the method further comprises, creating a database element to a database based on at least one action selected from the group of actions associated with the creation of the user-interface element, and adding at least one information attribute to the created database element.

Optionally, the group of actions associated with modifying of the user-interface initiate is deleting at least partly the created database element.

The present disclosure also relates to the system as described above. Various embodiments and variants disclosed above apply mutatis mutandis to the system.

Throughout the present disclosure, the term "server" as used herein refers to an arrangement of physical or virtual computational entities such as a processing arrangement, and a memory unit or a database structure that includes programmable components configured to store, process and/or share information. It will be appreciated that the server may be a single hardware server or a plurality of hardware servers operating in a parallel or distributed architecture.

Furthermore, the server comprises a database operable to store the information related to the desired task performed using the aforementioned method by the aforementioned system.

Throughout the present disclosure, the term "voice managing server" as used herein refers to the server associated with a voice management system. The voice management system may typically be implemented as a speech recognition system. The voice managing server is communicably coupled to the apparatus, and specifically with the microphone of the apparatus. The voice managing server processes the voice commands received via the microphone and provide the processed information to the apparatus. It will be appreciated that the voice managing server processes information as received in real-time. Moreover, the processed information is provided to the apparatus in real-time. It will be appreciated that the voice managing server enables processing the voice commands from natural language to a formatted machine-readable language, and the said formatted machine-readable language is subsequently provided to the machine associated with the voice managing server (in this case, the apparatus), for executing the instructions corresponding to the received first and second voice commands.

The voice managing server receives the first and the second voice commands of the first type at the first and the second moments of time, respectively, corresponding to the creation of the first and the second user-interface elements comprising the first and the second information having at least one information parameter associated with the first and the second information. Specifically, the voice managing server creates instructions for rendering the first and the second user-interface elements using the first and second voice commands, respectively. More specifically, the voice managing server provides the created instructions to the apparatus for the processor thereof to execute the received set of instructions.

Moreover, the voice managing server is operable to receive the third voice command of the second type at the third moment of time. Pursuant to the third voice command, the modification process is initiated for modifying one of the first or the second user-interface elements. In this regard, the voice managing server is operable to extract, from the third voice command, a data to identify target for the modification of the first or the second user-interface element. Herein, the term "data to identify target" refers to the information contained in the third voice command. The data to identify target is or comprises at least one of: the first information, the second information, at least one information attribute associated with the first information or the second information, the modifying-intent expression or the at least one modifying-intent attribute. Herein, the term "target" refers to the modifying first or the second user-interface element, and specifically, the modifying first information or second information, or at least one information attribute associated with the first information or the second information. Furthermore, the voice managing server is operable to creating a set of instructions to modify the identified first or second user-interface element based on the third voice command. The set of instructions include modifying the first or the second user-interface element based on the first or the second voice command with the at least one modifying-intent attribute based on the third voice command. The voice managing server is operable to provide the created set of instructions to the apparatus for the processor thereof to execute the received set of instructions. The set of instructions are executed by the processor of the apparatus to modify the first or the second user-interface element and render or re-render the said modification on the user-interface of the apparatus.

Optionally, the voice management system may typically be implemented as the voice-to-text converting module, as discussed above. More optionally, the voice managing server provides processed information to the apparatus in the form of text that is rendered on the user-interface of the apparatus.

Optionally, the voice managing server stores a log history related to the first information, the second information, at least one information attribute associated with the first information or the second information, values corresponding to the at least one information attribute, the creating-intent expression, the modifying-intent expression, the at least one modifying-intent attribute, the modified first user-interface element, and/or the modified second user-interface element.

Optionally, the voice managing software is configured for speech adaptation, i.e. categorizing spoken words or numbers into different classes, such as entities, addresses, years, weight and so forth. Moreover, the voice managing software is configured to provide voice-to-text conversion of the voice commands in a desired format. In this regard, automatic speech recognition, natural language processing and artificial intelligence operations may be involved in transforming (namely, transcribing) the voice commands into text by semantic interpretation of the voice commands. Furthermore, the voice managing server is configured for noise robustness by cancelling out noise from environment while processing the voice commands. Additionally, the voice managing server is configured for multilingual scenarios.

Optionally, the system is coupled to a service provider server. The term "service provider server" as used herein refers to the server associated with the service provider. Typically, the service provider may be for example an online seller, a food joint, a grocery store, a departmental store, and so forth. The service provider server stores information related to a plurality of entities and at least one information attribute associated with the each of the plurality of entities. Optionally, the service provider server is coupled in communication with the apparatus via a communication network. The service provider server provides information related to the plurality of entities, each having at least one information attribute associated therewith to the user of the apparatus. It will be appreciated that the said information comprises names or categories of the entities and at least one information attribute critical for identifying the corresponding entity. While in operation, the service provider server is operable to provide the information of related to the plurality of entities, each having at least one information attribute associated therewith to the apparatus and receive a user response based on the provided information. Notably, the user response is a selection of at least one of the plurality of entities, each having at least one information attribute associated therewith. Optionally, the service provider application program interface is downloadable from a software application store, for example, such as an "App store" of the apparatus.

In an exemplary implementation, the aforementioned method may be used to generate or create a voice-controlled shopping list to be realized with a service provider. In this regard, the user-interface is populated with the required information, i.e. the first and the second information, based on the first voice command and second voice command, with the first user-interface element and the second user-interface element respectively comprising the first information and second information having at least one information attribute associated therewith. Subsequent to population of the user-interface with the first and the second user-interface elements, one of the first and the second user-interface elements is modified based on the third voice command.

The voice-controlled shopping list is initiated with receiving, at the first moment of time, the first voice command of the first type, wherein the first voice command states "Add 1 kg of bananas". It will be appreciated that first voice command is split-up and each of primary words constituting the first voice command is received at different time-steps, such as t1 ("Add"), t2 ("1 kg"), and t3 ("Bananas"). Each of the primary words constituting the first voice command are analysed to determine the creating-intent expression ("Add"), the first information entity ("Bananas"), and the at least one information attribute ("1 kg") associated with the first information. Subsequently, based on the creating-intent expression, the first user-interface element is created and rendered on the user-interface, wherein the first user-interface element reads "Bananas 1 kg".

Similarly, at the second moment of time, the second voice command of the first type is received, wherein the second voice command states "And also 2 kg of apples". It will be appreciated that second voice command is split-up and each of primary words constituting the second voice command is received at different time-steps, such as t4 ("And also"), t6 ("2 kg"), and t6 ("Apples"). Each of the primary words constituting the second voice command are analysed to determine the creating-intent expression ("And also"), the second information entity ("Apples"), and the at least one information attribute ("2 kg") associated with the second information. Subsequently, based on the creating-intent expression, the second user-interface element is created and rendered on the user-interface, wherein the second user-interface element reads "Apples 2 kg".

To initiate the modification process, at the third moment of time, the third voice command of the second type is received, wherein the third voice command states "Actually not 1 kg but 3 kg". It will be appreciated that third voice command is split-up and each of primary words constituting the third voice command is received at different time-steps, such as t7 ("Actually"), t8 ("not"), t9 ("1 kg") and t10 ("but 3 kg"). Each of the primary words constituting the third voice command are analysed to determine the modifying-intent expression ("actually") and the at least one modifying-intent attribute ("not" and "1 kg") associated with the first or the second information ("Banana"), and the modifying value of the at least one information attribute ("3 kg"). Subsequently, based on the modifying-intent expression, the corresponding first user-interface element is modified and rendered on the user-interface, wherein the modified first user-interface element reads "Bananas 3 kg".

A further modification may be introduced to the modified information associated with the first user-interface element, namely the user does not want to have 3 kg of bananas but 1 kg, i.e. the previous value. In this regard, a new voice command (namely, a new third voice command of the second type) stating "keep the previous value anyway" is received. It will be appreciated that new voice command is split-up and each of primary words constituting the new voice command is received at different time-steps, such as t11 ("Keep") and t12 ("previous value anyway"). Each of the primary words constituting the new voice command are analysed to determine the modifying-intent expression ("keep") and the at least one modifying-intent attribute ("previous value anyway") associated with the first or the second information ("Banana"). Moreover, the words "previous value" indicate that the intent of the new voice command is to re-modify a modified value. Since the modification was associated with the first user-interface element, and the previous value that was modified was "1 kg", therefore, the first user-interface element is modified back to "1 kg" from "3 kg". Subsequently, based on the modifying-intent expression, the corresponding first user-interface element is re-modified and rendered on the user-interface, wherein the re-modified first user-interface element reads "Bananas 1 kg". The finalized list is then provided to the service provider server and order confirmation is shared on the apparatus.

It will be appreciated that a person skilled in the art will recognize that voice-controlled user-interfaces are beneficial in multitasking productivity in indoor spaces (such as office spaces, smart homes, smartphones, smart watches, automobiles, domotics (home automation, for example smart light fixtures, thermostats, smart locks, and so forth), computers, home appliances (for example, owens, fridges, washing-machines), and other Internet of Things (IoT)) or outdoor spaces (such as construction sites, oil refineries, driving, and so on), and the aforementioned exemplary implementation does not unduly limit the scope of the claims.

DETAILED DESCRIPTION OF THE DRAWINGS

Referring to FIG. 1, there is shown a flowchart 100 illustrating steps of a method for modifying a user-interface using voice commands, in accordance with an embodiment of the present disclosure. At step 102, a first voice command of a first type is received at a first moment of time. At step 104, a first user-interface element is created using the first voice command, the first user-interface element comprising a first information, the first information having at least one information attribute associated with the first information. At step 106, a second voice command of the first type is received at a second moment of time, wherein the second moment of time is later than the first moment of time. At step 108, a second user-interface element is created using the second voice command, the second user-interface element comprising a second information, the second information having at least one information attribute associated with the second information. At step 110, a third voice command of a second type is received at a third moment of time, wherein the third moment of time is later than the second moment of time. At step 112, a modification process for modifying one of the first or second user-interface elements is initiated using the third voice command. The modification process comprises extracting, from the third voice command, one of: the first information, the second information, or at least one information attribute associated with the first information or the second information, identifying the corresponding first user-interface element or the second user-interface element based on the extracted at least one of: the first information, the second information, or at least one information attribute associated with the first information or the second information, extracting, from the third voice command, a modifying-intent expression or at least one modifying-intent attribute, and modifying the identified first user-interface element or the second user-interface element based on at least one of: the modifying-intent expression or the at least one modifying-intent attribute.

At step 114, the modified first or second user-interface element is rendered on the user-interface.

The steps 102, 104, 106, 108, 110, 112 and 114 are only illustrative and other alternatives can also be provided where one or more steps are added, one or more steps are removed, or one or more steps are provided in a different sequence without departing from the scope of the claims herein.

Figure 2:
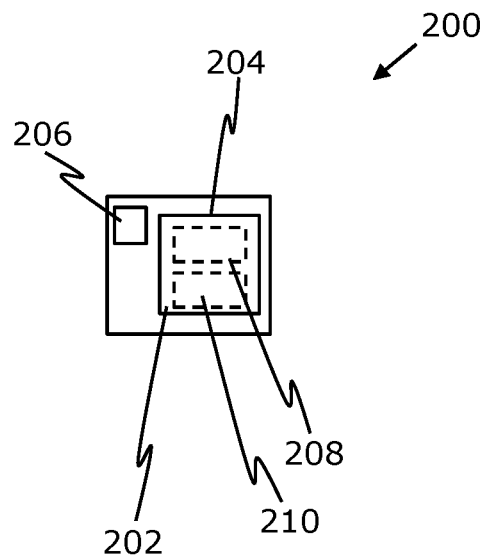
FIG. 2 is a schematic illustration of an apparatus for modifying a user-interface using voice commands, in accordance with an embodiment of the present disclosure.

Referring to FIG. 2, illustrated is a schematic illustration of an apparatus 200 for modifying a user-interface 202 using voice commands, in accordance with an embodiment of the present disclosure. The apparatus 200 comprises a display 204 for rendering the user-interface 202 thereon and a microphone 206 for receiving voice commands, and a processing arrangement (not shown). The processing arrangement is operable to receive a first voice command of a first type at a first moment of time, create a first user-interface element 208 using the first voice command, the first user-interface element 208 comprising a first information, the first information having at least one information attribute associated with the first information, receive a second voice command of the first type at a second moment of time, wherein the second moment of time is later than the first moment of time, create a second user-interface element 210 using the second voice command, the second user-interface element 210 comprising a second information, the second information having at least one information attribute associated with the second information, receive a third voice command of a second type at a third moment of time, wherein the third moment of time is later than the second moment of time, initiate a modification process for modifying one of the first user-interface element 208 or the second user-interface element 210 using the third voice command, and render the modified first user-interface element 208 or the second user-interface element 210 on the user-interface 202.

Figure 3:
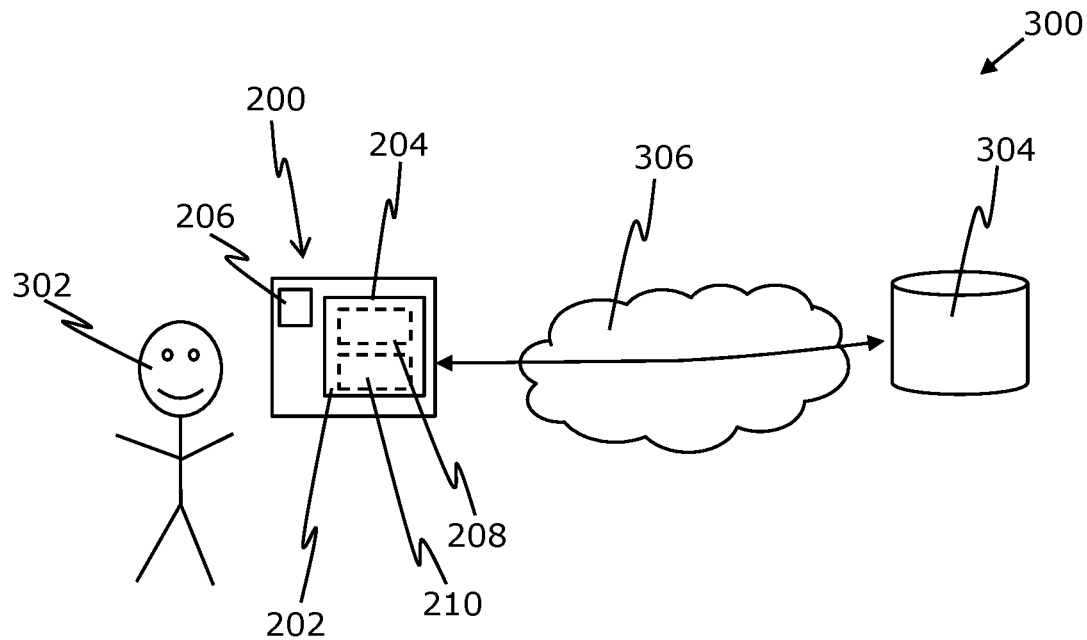
FIG. 3 is a schematic illustration of system for modifying a user-interface using voice commands, in accordance with an embodiment of the present disclosure.

Referring to FIG. 3, illustrated is a schematic illustration of system 300 for modifying a user-interface (similar to the user-interface 202 as explained in FIG. 2) using voice commands, in accordance with an embodiment of the present disclosure. The system 300 comprises an apparatus 200 (similar to the apparatus 200 as explained in FIG. 2) for receiving the voice commands from a user 302, and a voice managing server 304 communicably coupled to the apparatus 200 over a communication network 306. The voice managing server 304 is operable to receive a first voice command of a first type at a first moment of time, create instructions for rendering a first user-interface element (similar to the first user-interface element 208 as explained in FIG. 2), using the first voice command, receive a second voice command of the first type at a second moment of time, wherein the second moment of time is later than the first moment of time, create instructions for rendering a second user-interface element (similar to the second user-interface element 210 as explained in FIG. 2), using the second voice command, provide the created instructions to the apparatus 200, receive a third voice command of a second type at a third moment of time, wherein the third moment of time is later than the second moment of time, initiate a modification process for modifying one of the first user-interface element 208 or the second user-interface element 210 using the third voice command, wherein the modification process comprises extracting, from the third voice command, a data to identify target for modifying one of the first user-interface element 208 or the second user-interface element 210, and creating a set of instructions to modify the identified first user-interface element 208 or the second user-interface element 210 based on the third voice command, provide the created set of instructions to the apparatus 200, and use the provided set of instructions to re-render the modified first user-interface element 208 or the second user-interface element 210 on the user-interface 202.

Figure 6:
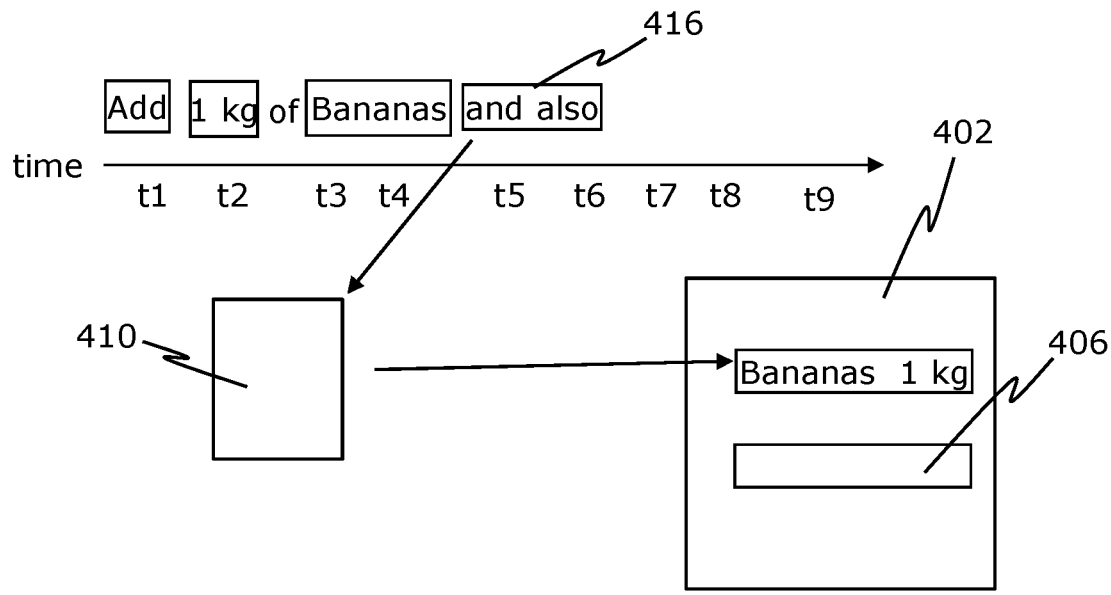
Figure 7:
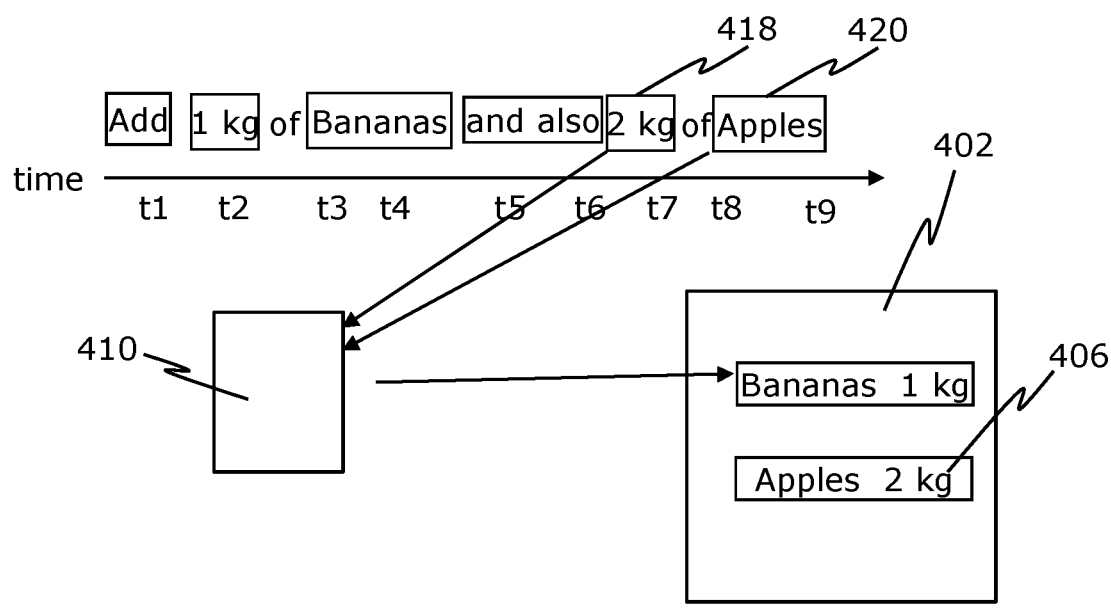
Figure 8:
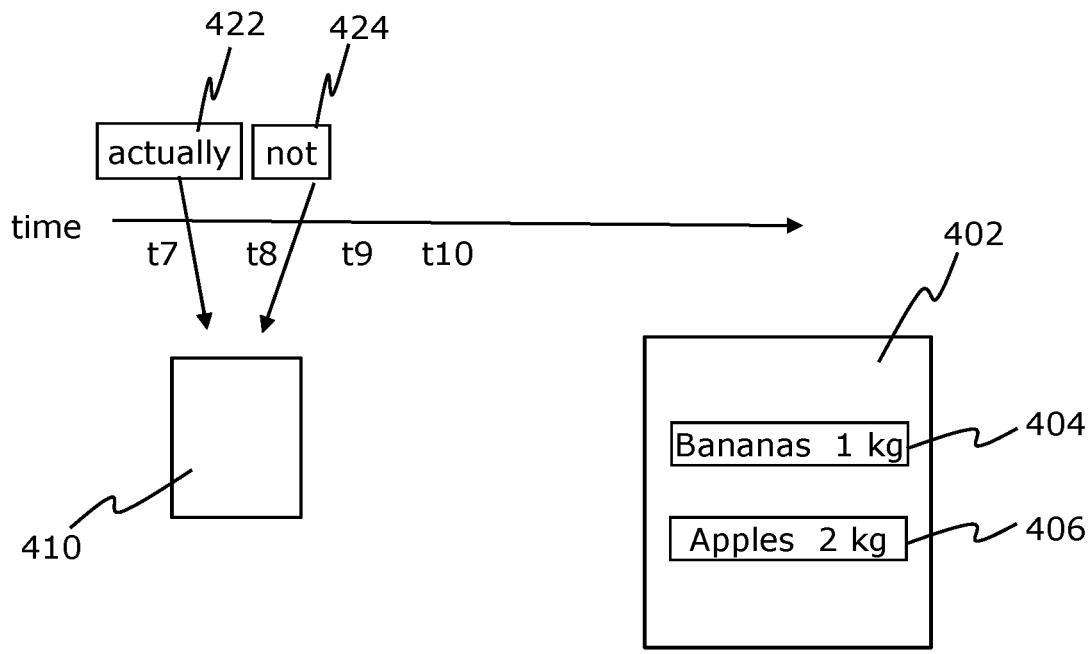
Figure 9:
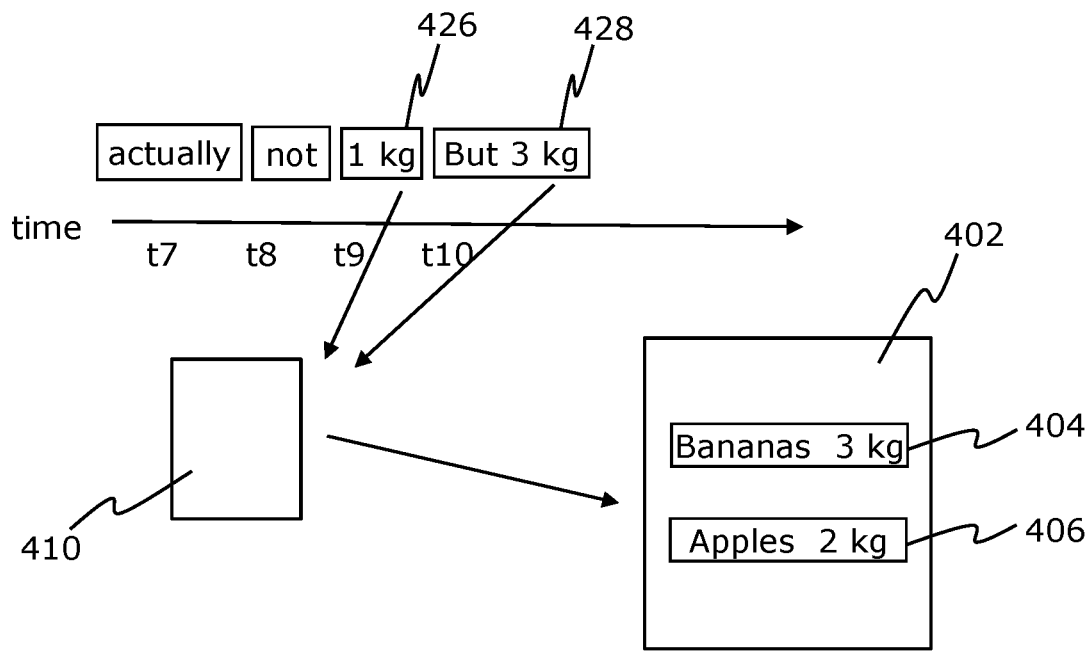
Figure 10:
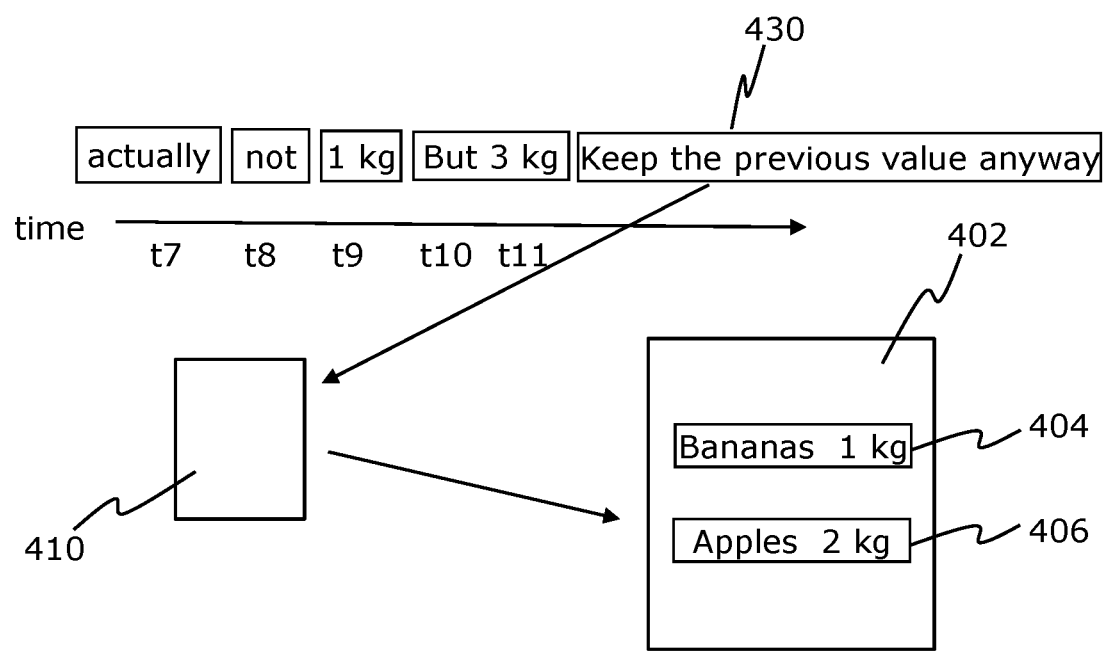

Referring to FIGS. 4-10, illustrated are timeline drawings for modifying a user-interface 402 using voice commands, in accordance with an embodiment of the present disclosure. FIGS. 4-7 illustrate how to populate the user-interface 402 with the first user-interface element 404 and the second user-interface element 406 respectively comprising the first information and second information having at least one information attribute associated therewith. FIGS. 8-10 illustrate how to modify the populated user-interface 402 with new information corresponding to the first information and second information having at least one information attribute associated therewith.

Figure 4:
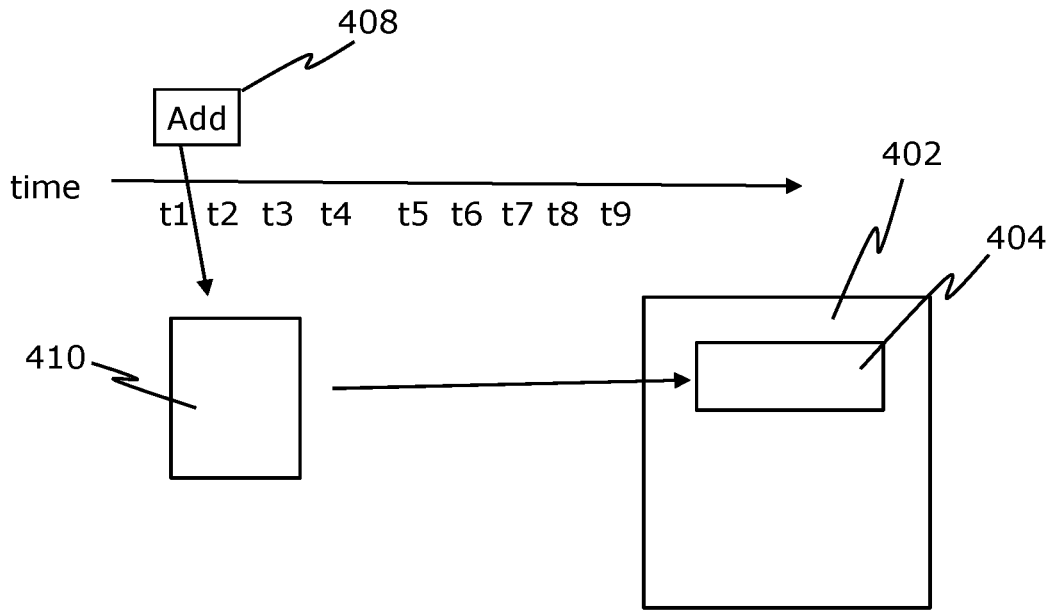
FIGS. 4-10 are timeline diagrams for modifying a user-interface using voice commands, in accordance with an embodiment of the present disclosure.

As shown in FIG. 4, at time t1 a word "Add" 408 is received as a part of the first voice command of the first type, wherein the first type relates to population of the first user-interface element 404. The word "Add" 408 is analysed by the voice managing server 410, and is determined to be a creating-intent expression. The creating-intent expression "Add" 408 triggers creation of the first user-interface element 404 on the user-interface 402. It will be appreciated that the first user-interface element 404 can be rendered on the user-interface 402 immediately or later when all information for the first user-interface element 404 is received as the complete first voice command, for example "Add 1 kg of Bananas".

Figure 5:
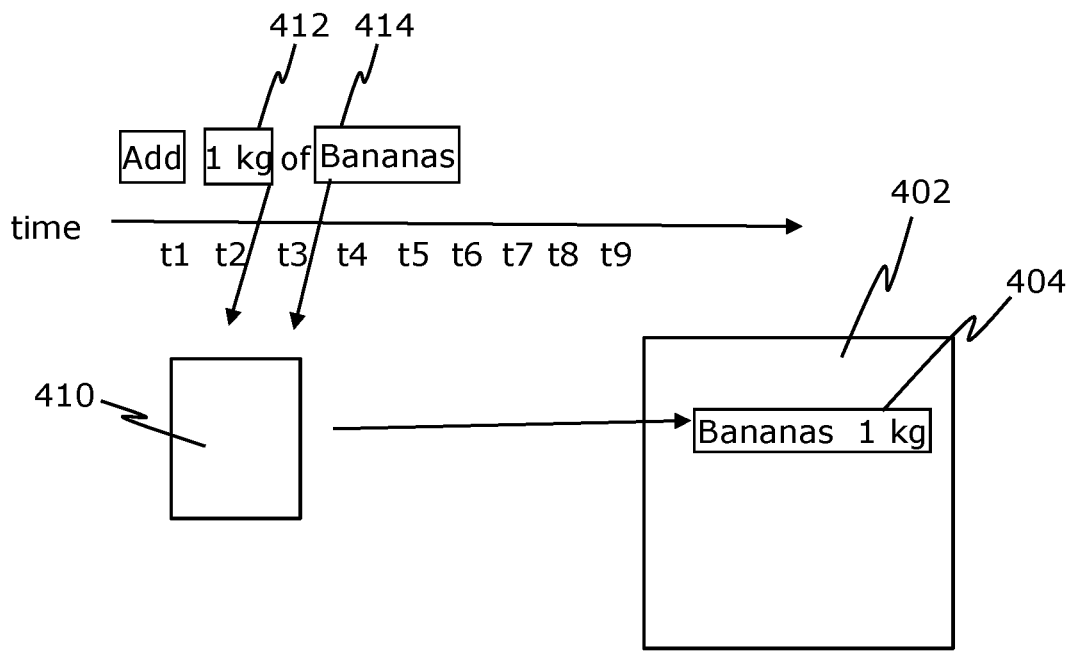

As shown in FIG. 5, at time t2 a word "1 kg" 412 and at time t3 a word "bananas" 414 are received as parts of the first voice command of the first type. The words "bananas" 414 and "1 kg" 412 are analysed by the voice managing server 410 and determined to be the first information and the information attribute associated with the first information of the first user-interface element 404. The first user-interface element 404 is rendered on the user-interface 402 as "Bananas 1 kg".

As shown in FIG. 6, at time t4 words "and also" 416 is received as a part of the second voice command of the first type. The words "and also" 416 is analysed by the voice managing server 410, and is determined to be another creating-intent expression. The creating-intent expression "and also" 416 triggers creation of a second user-interface element 406 on the user-interface 402. It will be appreciated that the second user-interface element 406 can be rendered on the user-interface 402 immediately or later when all information for the second user-interface element 406 is received as the complete second voice command, for example "and also 2 kg of Apples".

As shown in FIG. 7, at time t5 a word "2 kg" 418 and at time t6 a word "apples" 420 are received as parts of the second voice command of the first type. The words "apples" 420 and "2 kg" 418 are analysed by the voice managing server 410 and determined to be the second information and the information attribute associated with the second information of the second user-interface element 406, respectively. The second user-interface element 406 is rendered on the user-interface 402 as "Apples 2 kg".

The user-interface 402 has now been successfully populated with the first user-interface element 404 including the first information and the information attribute associated therewith and the second user-interface element 406 with the second information and the information attribute associated therewith. Moreover, the user wants to modify the first user-interface element 404, namely the user does not want to have 1 kg of bananas but 3 kg.

As shown in FIG. 8, at time t7 a word "actually" 422 and at time t8 a word "not" 424 is received as a part of the third voice command of the second type, wherein the second type relates to modification of the populated first or second information. The words "actually" 422 and "not" 424 are analysed by the voice managing server 410, and are determined to be a modifying-intent expression and a modifying-intent attribute associated with the modifying-intent expression, respectively. The words "actually" 422 and "not" 424 triggers modifying one of the first user-interface element 404 or the second user-interface element 406 on the user-interface 402.

As shown in FIG. 9, at time t9 a word "1 kg" 426 and at time t10 a word "but 3 kg" 428 are received as parts of the third voice command of the second type. The words "1 kg" 426 and "but 3 kg" 428 are analysed by the voice managing server 410 and determined to be values of information attributes and modifying-intent attribute. Since, the voice managing server 410 determined the words "actually" 422 and "not" 424 to be the modifying-intent expression and the modifying-intent attribute associated therewith, the voice managing server 410 compares attributes of the first user-interface element 404 and the second user-interface element 406. As the information attribute "1 kg" is associated with the first information entity "bananas" 414 of the first user-interface element 404, thus the desired modification will be associated with the first user-interface element 404. The information attribute value of "1 kg" is changed to "3 kg" in the first user-interface element 404 and the modified information is rendered in the first user-interface element 404 of the user-interface 402 as "Bananas 3 kg".

Notably, a further modification may be introduced to the modified information associated with the first user-interface element 404, namely the user does not want to have 3 kg of bananas but 1 kg, the previous value.

Aa shown in FIG. 10, at time t11 a phrase "keep the previous value anyway" 430 is received as a new third voice command of the second type. The word "keep" and the rest of phrase, i.e. "the previous value anyway" are analysed by the voice managing server 410, and determined to be a modifying-intent expression and a modifying-intent attribute associated with the modifying-intent expression, respectively. Moreover, the words "previous value" indicate that the intent of the new third voice command is to re-modify a modified value. Since the modification was associated with the first user-interface element 404, and the previous value that was modified was "1 kg", therefore, the first user-interface element 404 is modified back to "1 kg" from "3 kg". The re-modified information is rendered in the first user-interface element 404 of the user-interface 402 as "Bananas 1 kg". In such case, the voice command need not explicitly carry the word "1 kg" again.

It may be understood by a person skilled in the art that FIGS. 4-10 illustrate simplified implementations of the method for modifying a user-interface using voice commands, for sake of clarity, which should not unduly limit the scope of the claims herein. The person skilled in the art will recognize many variations, alternatives, and modifications of embodiments of the present disclosure. For example, the said example implementation may be used for populating any number of user-interface elements and modifying any of the said user-interface elements to be modified or rolled back to any previous state. Furthermore, any parameter value of the entities can be modified independently.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for modifying a user-interface using voice commands, the method comprising
   receiving a first voice command of a first type at a first moment of time;
   creating a first user-interface element using the first voice command, the first user-interface element comprising a first information, the first information having at least one information attribute associated with the first information;
   receiving a second voice command of the first type at a second moment of time, wherein the second moment of time is later than the first moment of time;
   creating a second user-interface element using the second voice command, the second user-interface element comprising a second information, the second information having at least one information attribute associated with the second information;
   receiving a third voice command of a second type at a third moment of time, wherein the third moment of time is later than the second moment of time;
   initiating a modification process for modifying one of the first or second user-interface elements using the third voice command, wherein the modification process comprises:
      extracting, from the third voice command, one of: the first information, the second information, or at least one information attribute associated with the first information or the second information;
      identifying the corresponding first user-interface element or the second user-interface element based on the extracted at least one of: the first information, the second information, or at least one information attribute associated with the first information or the second information;
      extracting, from the third voice command, a modifying-intent expression or at least one modifying-intent attribute, and
      modifying the identified first user-interface element or the second user-interface element based on at least one of: the modifying-intent expression or the at least one modifying-intent attribute, and
   rendering the modified first or second user-interface element on the user-interface.

2. The method according to claim 1, wherein creating the first or second user-interface elements comprises identifying a creating-intent expression, associated with the first type, from the first or the second voice commands.

3. The method according to claim 2, wherein the creating-intent expression comprises a first set of keywords defining a beginning of the first or second voice commands.

4. The method according to claim 3, wherein the first set of keywords are selected from a group of actions associated with the creation of the first and the second user-interface elements.

5. The method according to claim 2, wherein the first keywords comprise any one of: "add", "add-on", "add-up", "put-in", "begin", "start", "further", "additionally", "include", "append", "join", "let's begin", "please add", "add more", and the second keywords comprise any one of: "change", "modify", "actually", "not", "not", "reduce", "remove", "please change", "please modify", "add more", or "keep the previous value anyway".

6. The method according to claim 1, wherein the modifying-intent expression comprises a second set of keywords defining a beginning of the third voice command.

7. The method according to claim 6, wherein the second set of keywords are selected from a group of actions associated with modifying the first or the second user-interface element.

8. The method according to claim 1, wherein the first information or second information comprises one of a grocery item, a utility item, a clothing item, a food item.

9. The method according to claim 1, wherein the at least one information attribute comprises one of: a weight, a number, a quality, a cost, a color, a make, a brand name, a size, a gender, a source, and a credibility.

10. The method according to claim 1, further comprising creating a log history for storing data related to each of the first and the second user-interface elements.

11. The method according to claim 10, wherein the log history comprises data related to the first information, the second information, at least one information attribute associated with the first information or the second information, values corresponding to the at least one information attribute, the creating-intent expression, the modifying-intent expression, the at least one modifying-intent attribute, the modified first user-interface element, and the modified second user-interface element.

12. The method according to claim 1, wherein the method further comprising creating a database element to a database based on at least one action selected from the group of actions associated with the creation of the user-interface element, and adding at least one information attribute to the created database element.

13. The method according to any of the claim 12, wherein the group of actions associated with modifying of the user-interface initiate is deleting at least partly the created database element.

14. An apparatus for modifying a user-interface using voice commands, the apparatus comprising a hardware processor configured to execute non-transitory machine readable instructions, wherein execution of the non-transitory machine readable instructions by the processor is processing arrangement configured to cause the apparatus to:
  receive a first voice command of a first type at a first moment of time,
  create a first user-interface element using the first voice command, the first user-interface element comprising a first information having at least one information attribute associated with the first information,
  receive a second voice command of the first type at a second moment of time, wherein the second moment of time is later than the first moment of time,
  create a second user-interface element using the second voice command, the second user-interface element comprising a second information, the second information having at least one information attribute associated with the second information,
  receive a third voice command of a second type at a third moment of time, wherein the third moment of time is later than the second moment of time,
  initiate a modification process for modifying one of the first or second user-interface elements using the third voice command, wherein the modification process comprises
    extracting, from the third voice command, one of: the first information, the second information, or at least one information attribute associated with the first information or the second information,
    identifying the corresponding first user-interface element or the second user-interface element based on the extracted at least one of: the first information, the second information, or at least one information attribute associated with the first information or the second information,
    extracting, from the third voice command, a modifying-intent expression or at least one modifying-intent attribute, and
    modifying the identified first user-interface element or the second user-interface element based on at least one of: the modifying-intent expression or the at least one modifying-intent attribute, and
  render the modified first or second user-interface element on the user-interface.

15. The apparatus according to claim 14, further comprising a display for rendering the user-interface thereon and a microphone for receiving voice commands.

16. The apparatus according to claim 14, wherein the apparatus comprises a voice-to-text converting module being executable by the processing arrangement.

17. A system for modifying a user-interface using voice commands, the system comprising
  an apparatus for receiving the voice commands, and
  a voice managing server communicably coupled to the apparatus, the voice managing server operable to
    receive a first voice command of a first type at a first moment of time,
    create instructions for rendering a first user-interface element using the first voice command,
    receive a second voice command of the first type at a second moment of time, wherein the second moment of time is later than the first moment of time,
    create instructions for rendering a second user-interface element using the second voice command,
    provide the created instructions to the apparatus,
    receive a third voice command of a second type at a third moment of time, wherein the third moment of time is later than the second moment of time,
    initiate a modification process for modifying one of the first or second user-interface elements using the third voice command, wherein the modification process comprises:
      extracting, from the third voice command, a data to identify target for modifying one of the first user-interface element or the second user-interface element, and
      creating a set of instructions to modify the identified first or second user-interface element based on the third voice command;

provide the created set of instructions to the apparatus, and use the provided set of instructions to re-render the modified first or second user-interface element on the user-interface.

* * * * *